D. C. SMITH.
AUTOMOBILE LOCK.
APPLICATION FILED SEPT. 8, 1921.

1,423,269.

Patented July 18, 1922.
2 SHEETS—SHEET 1.

INVENTOR
David C. Smith

D. C. SMITH.
AUTOMOBILE LOCK.
APPLICATION FILED SEPT. 8, 1921.

1,423,269.

Patented July 18, 1922.
2 SHEETS—SHEET 2.

INVENTOR
David C. Smith
by

UNITED STATES PATENT OFFICE.

DAVID C. SMITH, OF TOLEDO, OHIO.

AUTOMOBILE LOCK.

1,423,269.　　　Specification of Letters Patent.　　Patented July 18, 1922.

Application filed September 8, 1921. Serial No. 499,160.

*To all whom it may concern:*

Be it known that I, DAVID C. SMITH, a citizen of the United States, and a resident of Toledo, county of Lucas, and State of Ohio, have made an Invention Appertaining to Automobile Locks; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient lock for locking a steering wheel from the steering shaft of an automobile. It particularly has for its object to provide in connection with such a lock, a simple and efficient means that may be made at a low cost of production that will permit disconnection of the steering wheel from the steering shaft without the use of a key and wherein the connection cannot be reestablished except by the use of the key.

Structures containing the invention may partake of different forms. To illustrate a practical application of the invention I have selected two structures that contain the invention and shall describe them hereinafter. The structures selected for purposes of illustration are shown in the accompanying drawings.

Figure 1:
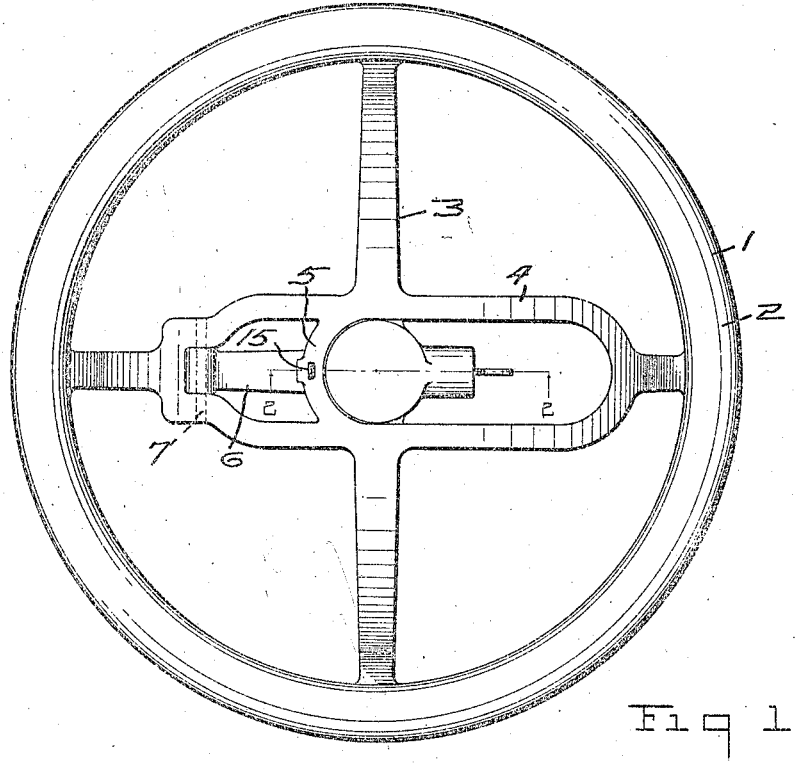
Figure 2:
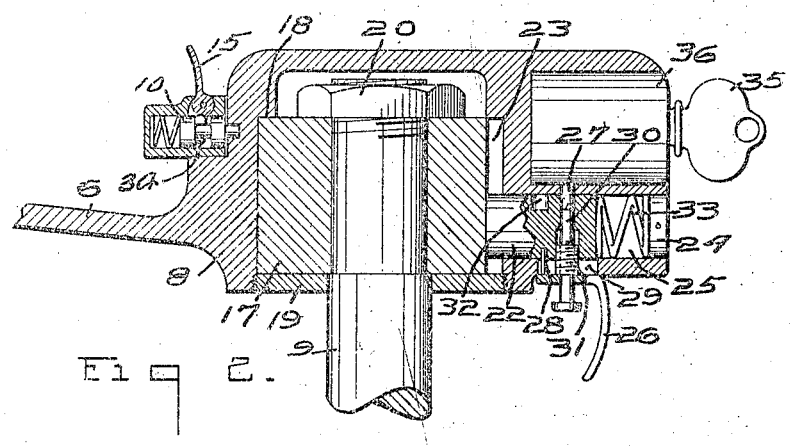
Figure 3:
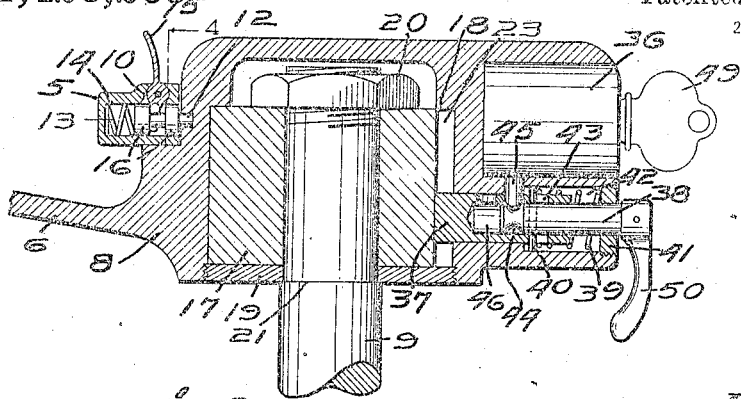
Figure 4:
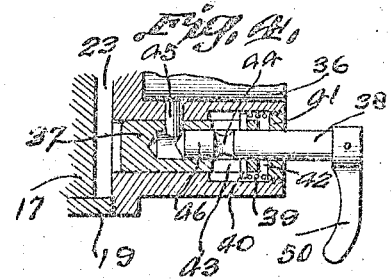

Figure 1 is a top view of an automobile steering wheel containing my invention. Fig. 2 is a sectional view taken on the line 2—2 indicated in Fig. 1. Fig. 3 is a sectional view similar to that of Fig. 2, showing a modified structure containing the invention. Fig. 4 shows the position of parts shown in Fig. 3 when the car is unlocked.

Fig. 1 is the steering wheel which has the rim 2 and the spider frame 3. The frame 3 has a slotted portion 4 that is crossed by a portion 5 thereof that is cast integral with the spider.

The wheel 1 is pivoted on the arm 6 by means of the pivot pin 7. The arm 6 extends from the shell 8 located on the end of the steering post 9. The wheel 1 is held in the steering position by means of the latch 10 located in the portion 5 of the spider 3. The latch 10 consists of the pin 12 that is spring pressed into an opening formed in the shell 8 by means of the spring 13 that is located between the end of the pin 12 and the bottom of the socket 14 formed in the portion 5 of the spider 3. A lever 15 is pivoted in the portion 5 and is provided with a forked end 34 located on opposite sides of the pin 12 and between the shoulders 16 whereby the latch may be released and the wheel 1 may be raised from the steering position.

The shell 8 is secured to the upper end of the shaft 9 by means of the cylindrical block 17 that is located between a shoulder 18 and the threaded disk 19 and by means of the nut 20 that is threaded on the end of the steering shaft 9. The block 17 is secured in position on the upper end of the steering shaft 9 by means of the shoulder 21. When the steering wheel is unlocked, the shell 8 and consequently the wheel 1, may be freely rotated about the shaft 9 without causing rotation of the shaft 9.

The shell may be connected or keyed to the lock 17 by means of the locking bolt 22 that is located in the wall of the shell and may be permitted to enter the slot 23 formed in the block 17. The bolt 22 may be pulled from the slot 23 by means of the trigger 26 except when the bolt 22 is engaged by the spring pressed locking pin 27. The trigger 26 is connected to the bolt 22 by means of the pin 28 that extends through the slot 29 formed in the wall of the shell. A releasing pin 30 freely movable through the bolt 22 also extends through the slot 29 and in position to be operated by the finger that operates the trigger 26 so as to raise the pin 30. A releasing pin 30 extends into the hole into which the pin 27 extends when the wheel is keyed to the shaft. The releasing pin 30 may thus be raised until its upper end is flush with the upper side of the bolt 22 which will raise the pin 27. In order to bring the upper end of the releasing pin 30 flush with the upper surface of the bolt 22 an adjustable threaded sleeve 31 may be located in the bolt 22 whereby the pin 27 may be raised just to the point that it will clear the bolt 22 when the bolt is pulled back by the trigger 26. The slot 29 is of such a length that it will permit the bolt 22 to be drawn from the block 17 a sufficient distance to cause the hole 32 to register with the pin 27. The pin 27 being spring pressed will thus enter the hole 32 and hold the bolt 22 out of the slot 23 against the action of the spring 33. The wheel will thus be held in its interlocked position and may be freely rotated on the shaft 9. If it is desired to lock the wheel to the shaft a key 35 may be inserted in the barrel 36 that is located in the shell 8 and the pin 27 may be withdrawn from the hole 32 whereupon the bolt 22 by the operation of the spring 33 will be pushed against the block 17. The shell 8 and the wheel 1 may be rotated until the bolt 22 enters the slot 23, whereupon connection will be re-established between the steering wheel and the shaft.

In the form of the invention illustrated in Fig. 3 the shell 8 is provided with the bolt 37, in the center of which is located a pin 38 that is spring pressed by the spring 39 placed between a cross pin 40 that extends through the pin 38 and the disk 41 which is threaded into the opening 42 in which the bolt 37 and the pin 38 are located. A trigger 50 may be connected to the pin 38 for manipulating the pin 38. The pin 40 extends through the slot 43 formed in the bolt 37 which permits limited movement of the pin 38 relative to the bolt 37. The pin 38 is provided with a pair of rounded shoulders 44 forming a neck into which the end of the locking pin 45 may extend. When the pin 38 is pulled back a short distance and while the pin 40 is moving in the slot 43 the pin 45 is raised so as to ride on the head 46 of the pin 38. The pin 40 then engages the bolt 37 to pull the bolt 37. The lower end of the pin 45 is rounded so that when the bolt 37 is engaged by the pin 40 the pin 45 will ride on to the top of the bolt 37. The bolt 37 is of a length such that when its outer end strikes the disk 41 the hole will register with the pin 45 and the head 46 will be withdrawn from beneath the pin 45 so that it cannot be raised by the end of the head 46, the pin 45 will thus hold the bolt 37 from the slot 23 until the pin 45 is raised by the key 49. The wheel may then be freely rotated relative to the shaft 9. When it is desired to lock the wheel to the shaft 9 the pin 45 is raised by the key 49 which permits the spring 39 to push the pin 38 and the bolt 37 inward to cause the bolt 37 to be pressed against the surface of the block 17. The wheel may then be rotated until the bolt 37 enters the slot 23 which will establish steering connection between the wheel 1 and the shaft 9.

I claim:

1. In a steering wheel and shaft locking means, a shell connected to the steering wheel and rotatable therewith, a bolt located in the shell for connecting the shell with the steering shaft, a locking pin adapted to extend into the bolt, a key-actuated member for withdrawing the locking pin from the bolt, a second movable pin for removing the locking pin from engagement with the bolt.

2. In a steering wheel and shaft locking means, a shell connected to the steering wheel and rotatable therewith, a bolt located in the shell for connecting the shell with the steering shaft, a key controlled locking pin adapted to extend into the bolt, a releasing pin located in the bolt for releasing the locking pin, the locking pin adapted to lock the bolt when the bolt is drawn from the wheel and shaft locking position.

3. In a steering wheel and shaft locking means, a shell connected to the steering wheel and rotatable therewith, a bolt located in the shell for connecting the shell with the steering shaft, a key controlled locking pin adapted to extend into and engage the bolt when the bolt is in either the shaft and shell connecting position or in the shaft and shell disconnecting position, a key actuated member for removing the locking pin from the bolt, a member for removing the locking pin from the bolt independent of the key controlled member.

4. In a steering wheel and shaft locking means, a shell connected to the steering wheel, and rotatable therewith, a bolt located in the shell for connecting the shell with the steering shaft, a key controlled locking pin adapted to extend into and engage the bolt when the bolt is in either the shaft and shell connecting position or in the shaft and shell disconnecting position, a key actuated member for removing the locking pin from the bolt, a pin located in the bolt for removing the locking pin from the bolt.

5. In a steering wheel and shaft locking means, a shell connected to the steering wheel and rotatable therewith, a bolt located in the shell for connecting the shell with the steering shaft, a key and a key controlled locking pin adapted to lock the bolt when withdrawn from its connecting position, and means for withdrawing the bolt from its connecting position independent of the operation of a key.

6. In a steering wheel and shaft locking means, a shell connected to the steering wheel and rotatable therewith, a bolt located in the shell for connecting the shell with the steering shaft, a key and a key controlled locking pin adapted to lock the bolt when withdrawn from its connecting position, and means for disconnecting the pin from engagement with the bolt when the bolt is in its connected position and operated independent of the key.

In testimony whereof I have hereunto subscribed my name to this specification.

DAVID C. SMITH.